(12) United States Patent
Ye et al.

(10) Patent No.: US 10,477,105 B2
(45) Date of Patent: Nov. 12, 2019

(54) METHOD AND SYSTEM FOR TRANSMITTING VIRTUAL REALITY (VR) CONTENT

(71) Applicant: Futurewei Technologies, Inc., Plano, TX (US)

(72) Inventors: Yinghua Ye, Los Gatos, CA (US); Hang Shi, Fremont, CA (US); Huida Dai, Cupertino, CA (US)

(73) Assignee: Futurewei Technologies, Inc., Plano, TX (US)

(*) Notice: Subject to any disclaimer, the term of this patent is extended or adjusted under 35 U.S.C. 154(b) by 145 days.

(21) Appl. No.: 15/617,859

(22) Filed: Jun. 8, 2017

(65) Prior Publication Data

US 2018/0359189 A1   Dec. 13, 2018

(51) Int. Cl.
*H04W 80/04*   (2009.01)
*H04N 5/232*   (2006.01)
(Continued)

(52) U.S. Cl.
CPC ....... *H04N 5/23238* (2013.01); *H04L 67/322* (2013.01); *H04L 67/38* (2013.01);
(Continued)

(58) Field of Classification Search
CPC ... H04L 47/2416; H04L 47/14; H04L 67/322; H04L 67/38; H04N 5/23238;
(Continued)

(56) References Cited

U.S. PATENT DOCUMENTS

| 8,965,579 B2 * | 2/2015 | Wang | B25J 9/1689 |
| | | | 700/259 |
| 2008/0130495 A1 * | 6/2008 | Dos Remedios | H04L 47/10 |
| | | | 370/230 |

(Continued)

FOREIGN PATENT DOCUMENTS

| CN | 105898138 A | 8/2016 |
| CN | 106454321 A | 2/2017 |
| CN | 106919248 A | 7/2017 |

OTHER PUBLICATIONS

Feng Qian et al, Optimizing 360 Video Delivery Over Cellular Networks. ATC 16 Proceedings of the 5th Workshop on All Things Cellular: Operations, Applications and Challenges, Oct. 3-7, 2016, pp. 1-6.

*Primary Examiner* — Sai Ming Chan
(74) *Attorney, Agent, or Firm* — James Anderson Harrison

(57) ABSTRACT

A transmitting virtual reality (VR) content method is disclosed that includes receive, by a network element, VR content packets transmitted by a VR content server for a single VR content scene and quality of service (QoS) transmission priorities for the VR content packets, wherein the QoS transmission priorities comprise a first QoS transmission priority corresponding to a first plurality of the VR content packets and a second QoS transmission priority corresponding to a second plurality of the VR content packets. In this embodiment, the method also includes transmitting, by the network element, the first plurality of the VR content packets based on the first QoS transmission priority and the second plurality of the VR content packets based on the second transmission priority, wherein the second QoS transmission priority is different from the first QoS transmission priority.

19 Claims, 10 Drawing Sheets

(51) Int. Cl.
*H04L 29/06* (2006.01)
*H04N 21/00* (2011.01)
*H04L 29/08* (2006.01)
*H04N 13/117* (2018.01)
*H04N 13/194* (2018.01)
*H04N 13/376* (2018.01)
*H04N 13/38* (2018.01)
*G06F 3/01* (2006.01)

(52) U.S. Cl.
CPC ............. *H04N 21/00* (2013.01); *G06F 3/011* (2013.01); *H04N 13/117* (2018.05); *H04N 13/194* (2018.05); *H04N 13/376* (2018.05); *H04N 13/38* (2018.05)

(58) Field of Classification Search
CPC .. H04N 13/376; H04N 13/117; H04N 13/194; H04N 13/38; H04N 21/00
USPC ....................................................... 370/328
See application file for complete search history.

(56) References Cited

U.S. PATENT DOCUMENTS

| | | | |
|---|---|---|---|
| 2010/0217855 A1* | 8/2010 | Przybysz | H04W 28/16 709/223 |
| 2014/0184475 A1* | 7/2014 | Tantos | H03M 13/356 345/8 |
| 2016/0353118 A1 | 12/2016 | Zhang et al. | |
| 2017/0332421 A1* | 11/2017 | Sternberg | H04W 76/11 |
| 2018/0070113 A1* | 3/2018 | Phillips | H04N 21/2143 |

* cited by examiner

METHOD AND SYSTEM FOR TRANSMITTING VIRTUAL REALITY (VR) CONTENT

TECHNICAL FIELD

The present disclosure is related to Virtual Reality (VR) Video, and in particular, to sending the VR content via a network.

BACKGROUND

Virtual reality video systems desirably support 360 degrees of view to provide a panoramic view to users. Virtual reality systems allow users to freely control their viewing direction during video play-back. Such 360 degree video systems compute and display the viewing area based on the orientation of a display and user, and the field of view (FOV) that a user is likely able to see for any given viewing direction.

Current 360 degree video delivery techniques typically use the delivery scheme used for traditional video. Typically, the VR content provider encodes and sends VR content including visible portions and those portions that are not visible for the current viewing direction. Sending all of these encoded portions of the VR content requires high bandwidth and consumes more resources than are required for delivering the current visible portion of the view using traditional delivery schemes. The usage of such resources to support traditional delivery schemes creates network loading issues, adds to network latency and lowers network performance and can cause a poor viewing experience.

SUMMARY

An first aspect of example embodiment includes a method performed by a network element for transmitting virtual reality (VR) content. In the method, the network element receives VR content packets transmitted by a VR content server for a single VR content scene and quality of service (QoS) transmission priorities for the VR content packets. Wherein, the QoS transmission priorities comprise a first QoS transmission priority corresponding to a first plurality of the VR content packets and a second QoS transmission priority corresponding to a second plurality of the VR content packets. And then, the network element transmits the first plurality of the VR content packets based on the first QoS transmission priority and the second plurality of the VR content packets based on the second transmission priority. Wherein the second QoS transmission priority is different from the first QoS transmission priority. Through the above embodiment, the QoS transmission priority corresponds to VR content packets, so that different VR content packets in a single VR content scene may be transmitted using different QoS transmission priority. Therefore, the transmission for the VR content packets with high QoS transmission priority may be assured.

An second aspect of example embodiment includes a method performed a virtual reality (VR) content server for transmitting VR content. In the method, the VR content server receives a VR content request for a single VR content scene, wherein the VR content request comprises information relating to a terminal line of sight. And then, the VR content server obtains, based on the information relating to the terminal line of sight, a field of view identifier (FOV ID) for the VR content request, and selects, based on the FOV ID, VR content packets that had been previously encoded from a plurality of sets of VR content packets; and determines quality of service (QoS) transmission priority for VR content packets, wherein the QoS transmission priority comprises a first QoS transmission priority for a first plurality of the VR content packets and a second QoS transmission priority for a second plurality of the VR content packets. Finally, the VR content server transmits the VR content packets and the QoS transmission priority. Through the method, the VR content server determines different QoS transmission for different VR content packets in a single VR content scene, so that all of the areas of a single VR content scene, may be transmitted with different QoS priority.

An third aspect of example embodiment includes a method performed by a terminal device for receiving virtual reality (VR) content. In the method, the terminal device receiving an index of a VR content scene, wherein the index comprises at least two field of view identifiers (FOV IDs) in relation to a terminal line of sight. And then the terminal device selects a FOV ID from the index based on a terminal line of sight, and sends a VR content request comprising the selected FOV ID for the VR content scene. After that, the terminal device receives the VR content packets having a first QoS corresponding to the selected FOV ID of the VR content scene; and receives VR content packets having a second and lower QoS and also having a different FOV ID of the VR content scene. Through the method, the terminal device may select the FOV ID before sending the VR content request, so that to receive VR content packets from the VR content server with different QoS priorities based on the FOV ID.

An fourth aspect of example embodiment includes a network element. Where, the network entity comprise a non-transitory memory comprising instructions, and one or more processors in communications with the memory. Where the one or more processors are configured to execute the instructions to: receive VR content packets transmitted by a VR content server for a single VR content scene and quality of service (QoS) transmission priorities for the VR content packets, wherein the QoS transmission priorities comprise a first QoS transmission priority corresponding to a first plurality of the VR content packets and a second QoS transmission priority corresponding to a second plurality of the VR content packets; and transmit the first plurality of the VR content packets based on the first QoS transmission priority and the second plurality of the VR content packets based on the second transmission priority, wherein the second QoS transmission priority is different from the first QoS transmission priority.

A fifth aspect of example embodiment includes a virtual reality (VR) content server. Wherein, the VR content server comprises a non-transitory memory comprising instructions, and one or more processors in communications with the memory. wherein the one or more processors are configured to execute the instructions performed by the VR content server in the second aspect of the example embodiment.

A six aspect of example embodiment includes a terminal device. Where the terminal device comprises a non-transitory memory comprising instructions, and one or more processors in communications with the memory, wherein the one or more processors are configured to execute the instructions performed by the terminal device in the third aspect of the example embodiment.

A seventh aspect of example embodiment includes a network element. Wherein the network element includes the function of the network element in the first aspect of example embodiment. The functions may be realized by hardware, or may be realized by software which are performed by hardware. And the hardware or the software include one or more module corresponding to the functions.

A eighth aspect of example embodiment includes a VR content server. Wherein the VR content server includes the function of the VR content server in the second aspect of example embodiment. The functions may be realized by hardware, or may be realized by software which are performed by hardware. And the hardware or the software include one or more module corresponding to the functions.

A ninth aspect of example embodiment includes a terminal device. Wherein the terminal device includes the function of the terminal device in the third aspect of example embodiment. The functions may be realized by hardware, or may be realized by software which are performed by hardware. And the hardware or the software include one or more module corresponding to the functions.

A tenth aspect of example embodiment includes a computer storage media. Where the computer storage media stores instructions performed by the network element in the first or the fourth aspect of example embodiment, and stores the program performed in the first or the fourth aspect of example embodiment.

A eleventh aspect of example embodiment includes a computer storage media. Where the computer storage media stores instructions performed by the VR content server in the second or the fifth aspect of example embodiment, and stores the program performed in the second or the fifth aspect of example embodiment.

A twelfth aspect of example embodiment includes a computer storage media. Where the computer storage media stores instructions performed by the terminal device in the third or the sixth aspect of example embodiment, and stores the program performed in the third or the sixth aspect of example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Virtual reality (VR) applications which include 360 degree video work best with low latency and high throughput. VR content should be delivered to human eyes in about 20 milliseconds (ms) for good quality of experience (QoE). Considering, VR processing time at a VR content server, transmission time for delivering VR content through one or more networks, and video rendering time of a terminal device, the goal of displaying VR content within 20 ms since a last display is challenging.

The conditions of a wireless link, such as network loading, interference, and transmission error rates are aspects of the wireless link that affect bandwidth and/or latency of communications using the wireless link. Streaming high definition VR content under bad link conditions adds to congestion, leads to packet losses and excessive packet retransmissions, and can result in an undesirable Quality of Experience (QoE) as well as impact other transmissions by adversely affection network operations.

Figure 1:
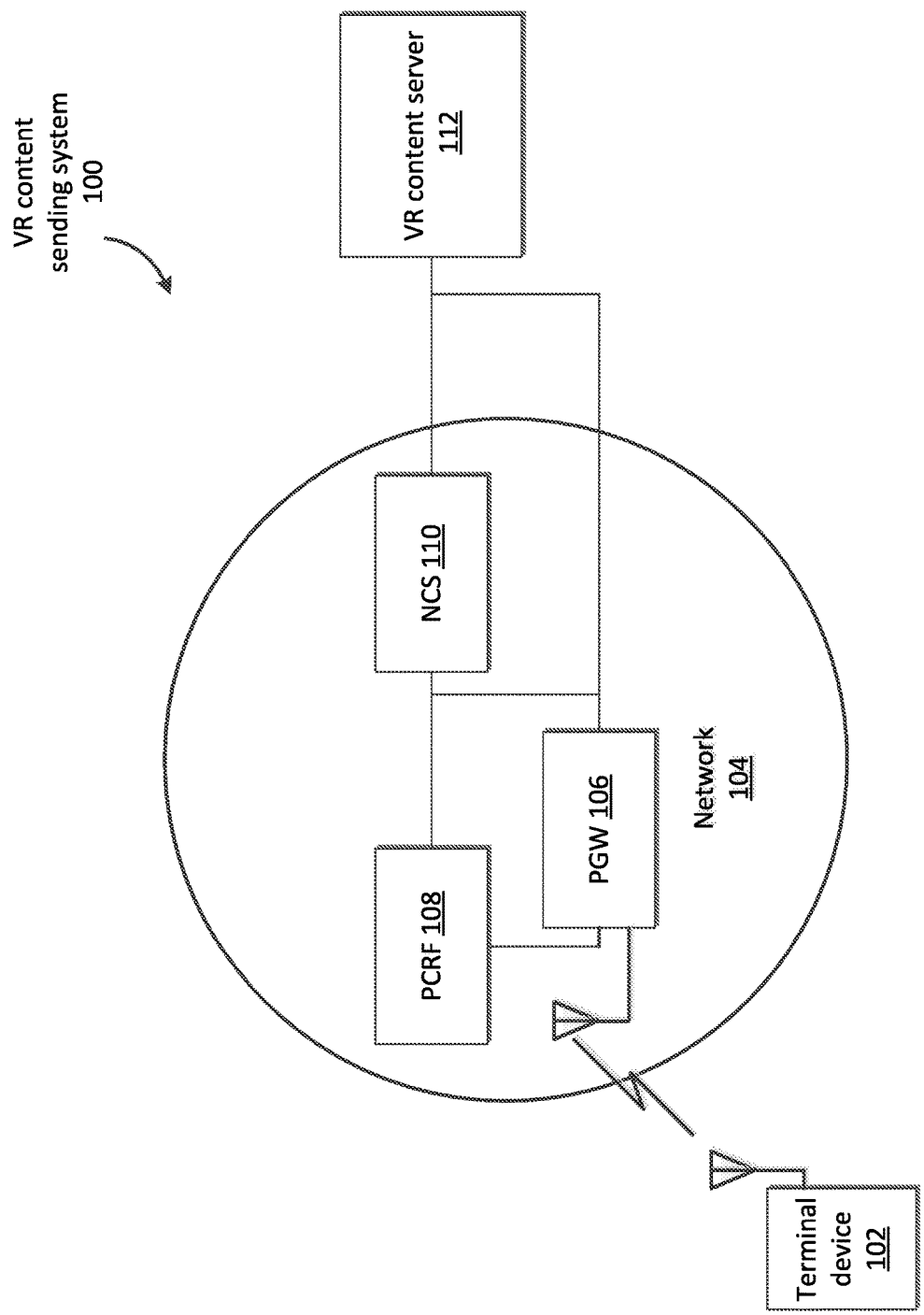
FIG. 1 illustrates a network diagram that illustrates a VR content distribution system 100 according to an example embodiment.

FIG. 1 illustrates a network diagram that illustrates a VR content distribution system 100 according to an example embodiment. VR services distribution system 100 may include a terminal device 102, a network 104 and a VR content server 112. The network 104 may include a packet data network gateway (PGW) entity 106, a network control service (NCS) entity 110 and a Policy and Charging Rules Function (PCRF) entity 110. Any known network may be used in place of network 104. Further, service capability exposure function (SCEF) can be used in place of NCS. Wireless terminal device 102 couples to network 104, and here, more specifically, to PGW 106 via a wireless communication link.

The terminal device 102 communicates with VR content server 112 and receives VR content packets from VR content server 112 via network 104. Typically, the VR content packets of a VR content scene is delivered in the form of VR content packets that are transmitted by VR content server 112. In the example of FIG. 1, the VR content packets are transmitted via PGW 106. NCS 110 is in communication with the PGW 106, learns the network condition and sends network data to the VR content server 112. PCRF 108 is in communication with the NCS 110 and PGW 106 to send QoS processing rules from the NCS 110 to the PGW 106. NCS 110 receives the QoS processing rule from the VR content server. In the described embodiment, the QoS processing rule prompts the network element entity to obtain QoS transmission priorities for the VR content packets, received from the VR content server.

In one embodiment, terminal device 102 is configured to receive index of the VR content scene that is transmitted by the VR content server 112. The index comprises at least two filed of view identifiers (FOV IDs). Terminal device 102 selects a FOV id from the index based on a terminal line of sight which is related to user's head motion, and sends the selected FOV ID within a content request to the VR content server 112. Here in the network 100, the content request and the index are transmitted via PGW 106 though they could be transmitted via other network elements which are not shown in the figure. In addition, terminal device 102 receives the VR content packets corresponding to the selected FOV ID from the VR content server 112 via the PGW 106.

PGW 106 receives the VR content packets from a VR content server 112, where VR content packets from different regions are assigned different quality of service (QoS) transmission priorities. For example, a first plurality of the VR content packets correspond to a first QoS transmission priority, a second plurality of the VR content packets correspond to a second QoS transmission priority, and a third plurality of the VR content packets correspond to a third QoS transmission priority. And the network element entity transmits the first, second or third plurality of the VR content packets based on the first, second or third QoS transmission priority respectively. In addition, the PGW 106 may provide network data to the NCS 110. The network data comprises at least one of throughput information, latency information, packet loss information and error rate information.

The NCS 110 receives the network data from the PGW 106 and sends the network data to the VR content server 112. In addition, the NCS receives QoS processing rule from the VR content server 112, and send the QoS processing rule to the PCRF 108. The PCRF 108 receives the QoS processing rule from the NCS 110, and sends the QoS processing rule to the PGW 106.

The VR content server 112 sends the VR content packets of a VR content scene to the terminal device 102 via network 104. In one embodiment, the VR content server receives a field of view identifier (FOV ID) selected by a terminal device and generates the VR content packets based on the received FOV ID. The VR content server then sends VR content packets of a scene but the VR content packets have differing QoS transmission priority values assigned thereto based on a relationship with the requested FOV ID. The VR content server 112 receives VR content request comprising a FOV ID from the terminal device 100 via the network 104 106. In addition, the VR content server 112 sends an index of VR content packets before sending the VR content packets. The index of VR content packets comprises at least two FOV IDs related to a terminal line of sight, so that the terminal can select the FOV ID from the FOV IDs based on the terminal line of sight.

Therefore, instead of sending each virtual reality (VR) packet with no consideration of network status and QoS, the PGW 106, or more generally, a User Plane Function (UPF) device in a next generation wireless network that is under development (presently referred to as "5G"), and any other device in other network) may send VR content packets based on the QoS transmission priorities. The (QoS) transmission priorities may include a first QoS transmission priority, a second QoS transmission priority, a third QoS transmission priority, and so on. Different QoS transmission priorities correspond to VR content packets from different view regions of a single scene. For example, the first plurality of the VR content packets corresponds to the first QoS transmission priority, the second plurality of the VR content packets corresponds to the second QoS transmission priority, and the third plurality of the VR content corresponds to the third QoS transmission priority.

Thus different VR content packets with different QoS transmission priorities can be delivered according to the QoS transmission priority, the content transmission quality of service may be ensured for the packets in the user's FOV, and the network latency should be reduced, and network performance can be improved because lower QoS ratings may be used for data packets that correspond to different portions of a single scene that are not in the user's FOV.

In addition, the terminal 102 may determine the FOV ID according to the terminal line of sight, and request VR content packets corresponding to the determined FOV ID. As such the VR content server determines the FOV ID after receiving the VR content request, and producing the VR content packets after determine the FOV ID are avoided. Therefore, the time for waiting to receive the VR content packets from the VR content server is saved.

Figure 2:
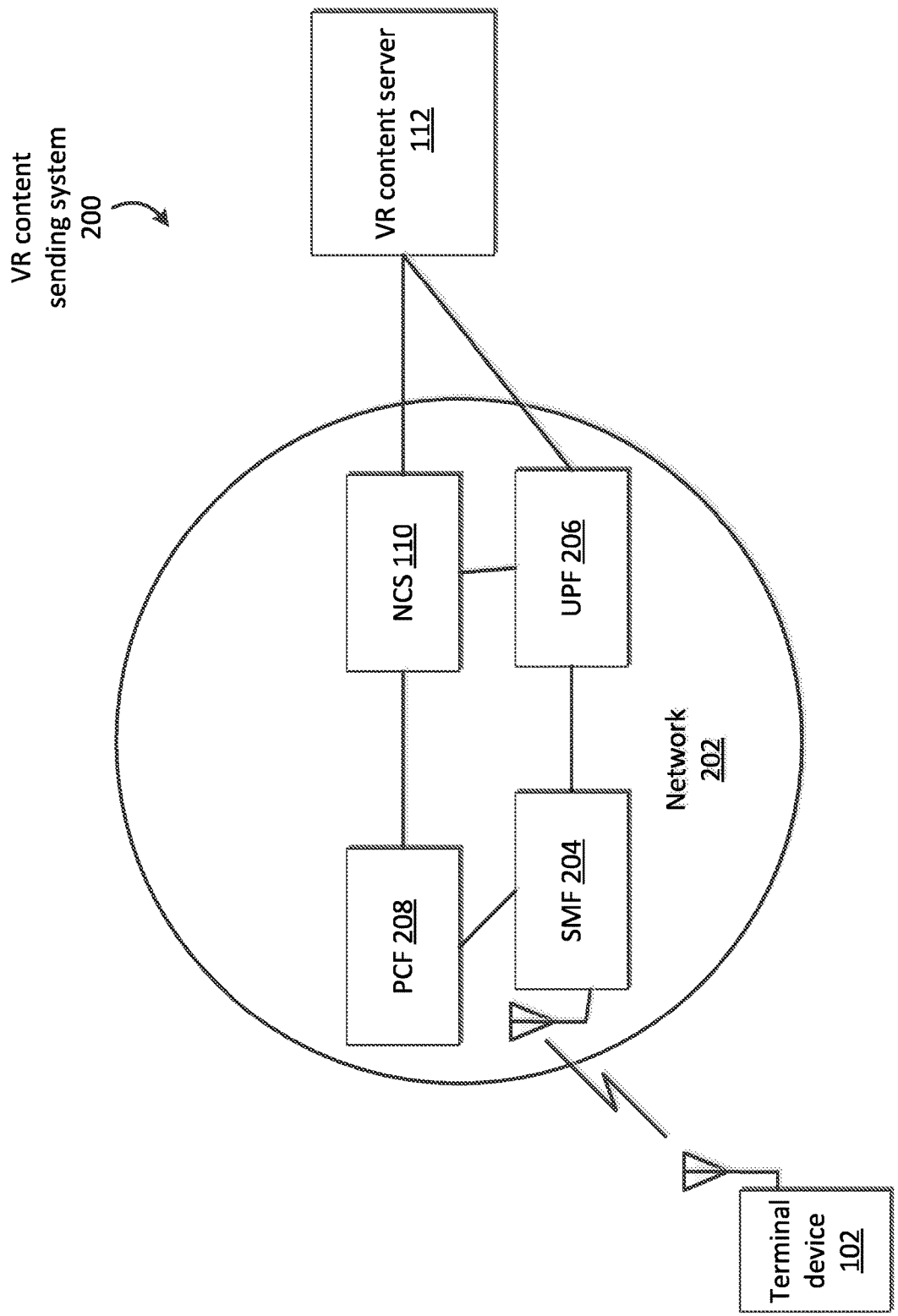
FIG. 2 illustrates other block diagram of a hierarchical VR content distribution system 200 according to an example embodiment.

FIG. 2 illustrates other block diagram of a hierarchical VR content distribution system 200 according to an example embodiment. Different from the VR services distribution system 100, the VR services distribution system 200 comprises different network 202 which may be used in a 5G network, including user plane function (UPF) entity 206, an NCS 110, a policy control function PCF entity 208, and an SMF entity 204. Any known network may be used in place of network 104, and a network exposure function (NEF) can be used in place of NCS 110.

In the hierarchical VR content distribution system 200, the terminal device 102 communicates with VR content server 112 and receives VR content packets from VR content server 112 via network 104. The NCS 110 is in communication with the UPF 206 and the VR content server 112, sends network data from the UPF 206 to the VR content server 112, and receives a QoS processing rule from the VR content server 112. The PCF 208 is in communication with the NCS 110 and SMF 204 to send the QoS processing rule from the NCS to the SMF 204, the QoS processing rule is included in a policy and charging control (PCC) rule generated by the PCF 208. The SMF 204 is in communication with the UPF 206 to send the QoS processing rule in a policy and charging control (PCC) rule to the UPF 206.

In addition to normally function for the network, network 202 also performs processes having some similarity with those of network 104 especially as it relates to the various embodiments and aspects of the present invention. For example, the UFP 206 performs the function of PGW 106, and the PCF 208 performs the function of PCRF 108. The details for the procedure of UPF 206, NCS 110 and PCF 208 should not be disclosed, and may refer to the description of FIG. 1.

FIGS. 1 and 2 show some embodiments of hierarchical VR content distribution systems 100 and 200 in which the VR content server 112 is separated from the networks 104 and 202. In alternative embodiments, the VR content server 112 may be a network entity included in the network.

Figure 3:
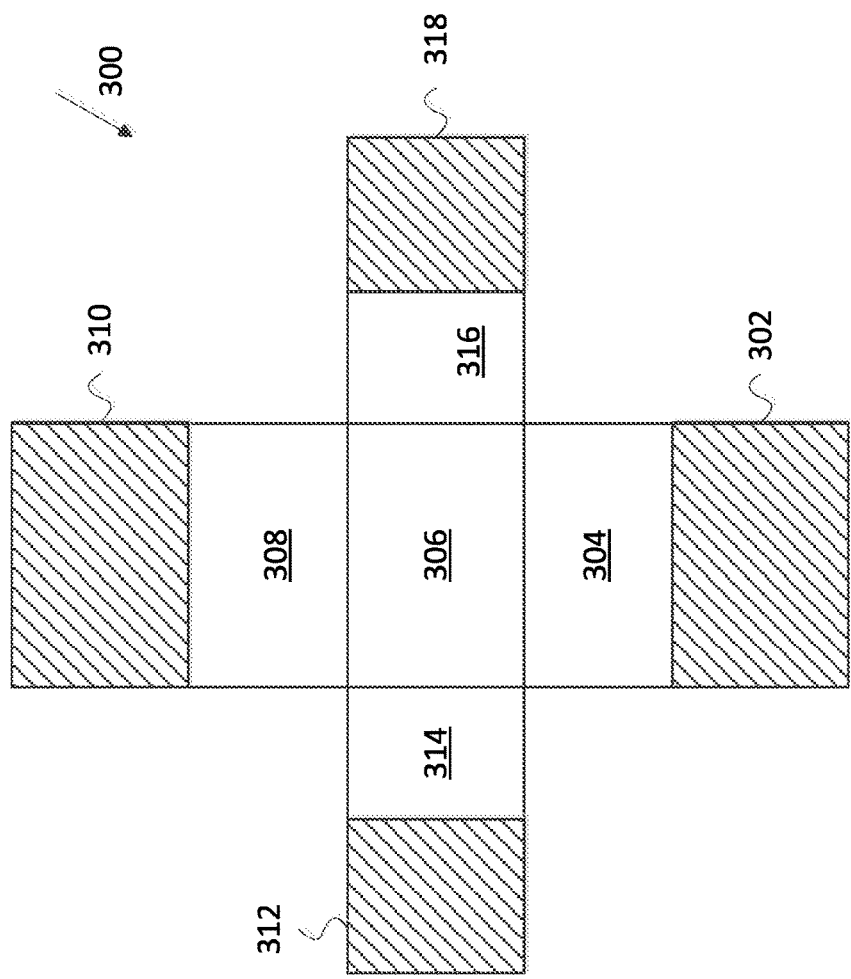
FIG. 3 illustrates a two-dimensional representation of transmission priority levels for different portions of a single 360 degree video content scene.

FIG. 3 illustrate a two-dimensional representation of transmission priority levels for different portions of a single 360 degree video content scene. Referring to FIG. 3, the 360 degree video content includes a plurality of VR content areas shown generally at 300 which are defined for different portions of the single VR content scene in relation to the terminal line of sight. Specifically, the content presented in horizontal direction illustrates the plurality of VR content areas related to terminal line of sight based on user's head motion in left and right directions, and the content presented in vertical direction illustrates the plurality of VR content areas related to terminal line of sight based on user's head motion in upper and down directions. the VR content areas 300 are defined in relation to a user's field of view (FOV), and the VR content areas comprise an FOV area represented by areas 306 (e.g., the area about the user's line of sight) as well vertically adjacent areas 304 and 308, at horizontally adjacent areas 314 and 316. The VR content areas 300 also comprise invisible areas 302, 310, 312 and 318. Invisible areas 312 and 318 represent invisible areas in the horizontal directions while areas 302 and 310 represent invisible areas in vertical directions. The FOV area 304 corresponds to an area is penetrated by the user's line of sight. The areas adjacent to FOV area 304 correspond to an area adjacent to the FOV area, and include areas 314, 316, 304 and 308. And the invisible area means an area that the user can't see, and include areas 312 and 318, 310 and 302.

It should be noted that in FIG. 3, the areas adjacent to the FOV area comprises 4 portions of the VR content scene that could become the FOV area based upon the user's head motion in the horizontal or vertical directions. Each of the 4 portions correspond to one portion of the VR content scene. Each of the invisible areas including areas 312 and 318, 310 and 302 in FIG. 3 correspond to one portion of the VR content scene. One aspect of the present embodiment is that FOV area 306 is transmitted with a first QoS, each area adjacent to the FOV area 306 (namely areas 314, 316, 304 and 308 may be transmitted with the first QoS or a second QoS that is lower than the first QoS. Each of the invisible areas (namely areas 312 and 318, 310 and 302) may be transmitted with a third QoS which is lower than the first Qos and may be lower than the second QoS). All of the areas of FIG. 3, though they are transmitted with different QoS ratings, are part of a single scene. In the described embodiments, a single 360 degree scene.

Figure 4:
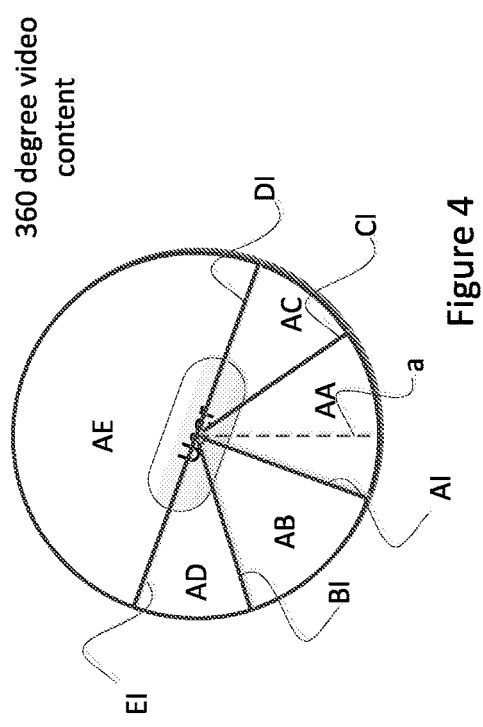
FIG. 4 illustrates a two dimensional FOV area view of different portions of a 360 degree video content scene according to one embodiment of the invention.

FIG. 4 illustrates a two dimensional FOV area view of different portions of a 360 degree video content scene according to one embodiment of the invention. In FIG. 4, a user with a terminal device is in the central point of the circle which shows the 360 degree video content scene. Line "a" is a reference line, set by the content server 112, from the central point of the 360 degree video to a point of the 360 degree video. In some embodiments, the point of 360 degree video, directed by the line a may be a central point of a panoramic video of the 360 degree video scene that is grid stitched. Line AI illustrates the terminal (or user) line of sight for the present orientation of the user terminal. The terminal line of sight is a line from a central point of the user terminal and a center point of the user's field of view. Line BI and Line CI are on opposite sides of the terminal line of sight that define the FOV. Lines DI and EI are on opposite sides of each other and help define the areas adjacent to the FOV area. More specifically, lines BI and EI define one adjacent area while lines CI and DI define a second adjacent area. The FOV area may be defined by lines BI and CI.

The angles created by lines BI&EI and CI&DI may be determined by the VR content server. The angle for the FOV created by lines BI and CI may be determined by the VR content server in one embodiment and by the terminal in another embodiment. It is not required, but in one embodiment, the angle for the FOV is greater than the angles for the adjacent areas.

As shown in FIG. 4, the 360 degree video content scene comprises multiple areas. Where, an area included by the lines BI and CI corresponds to an FOV area in one direction (such as in horizontal direction or in vertical direction), which identifies the extent of the observable world that is seen at any given moment. The areas included by lines BI and EI, and by lines CI and DI are area adjacent to the FOV area in one direction (such as in horizontal direction or in vertical direction). And an area from line DI to line EI is an invisible area which may comprise the area of 360 degree video content excluding the FOV area and the area adjacent to the FOV area.

Figure 5:
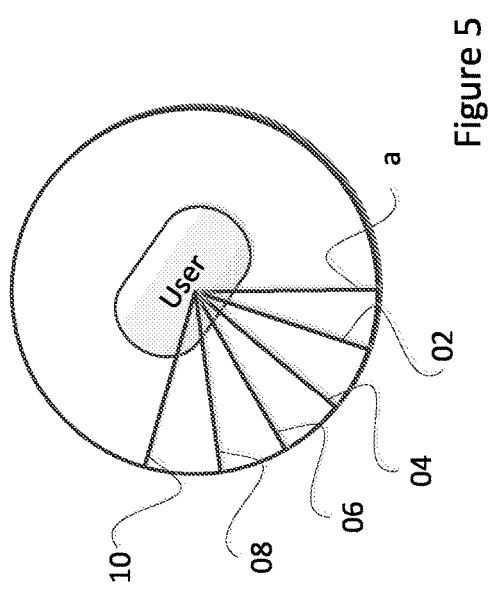
FIG. 5 illustrates the FOV IDs set by the content server 112 of the 360 degree video based on the user head motion in horizontal (corresponding to turn the head left and right) or in vertical (move the head upper and lower), according to an example embodiment.

FIG. 5 illustrates the FOV IDs set by the content server 112 of the 360 degree video based on the user head motion in horizontal (corresponding to turn the head left and right) or in vertical (move the head upper and lower), according to an example embodiment. In FIG. 5, a user with a terminal device 102 is in the central point of the circle which shows the 360 degree video content. Line "a" is a reference line, set by the content server 112, from the central point of the 360 degree video to a point of the 360 degree video. Lines 02, 04, 06, 08, and 10 are FOV IDs set by the VR content server 112 to correspond different terminal line of sights based on the user's head motion. The VR content server 112 may send the relationship between the FOV ID and the terminal line of sight to the terminal device 102. In some embodiment, the VR content server 112 may map the FOV ID 02 to the terminal line of sight which is the reference line "a" plus 20 degree to left, and the interval of each line of sight is 20 degree or any other degree. In other embodiment, the VR content server 112 may set the information of the terminal line of sight as the FOV ID. Such as, 20, 40, 80 and so on, and FOV ID 20 means the line of turning the terminal line of sight to 20 degree left, and the interval of each line of sight is 20 degree or any other number of degree.

It should be noted that FIGS. 4 and 5 are just presented as the 360 degree video content scene in two dimension based on the user head motion in two directions, such as the user turning his head left and right. In other illustrations, the user head motion may be also in other directions, such as up and down. The description for FOV area and the FOV ID in the other direction of the user head motion may be referred to the description in FIGS. 4 and 5.

Figure 6:
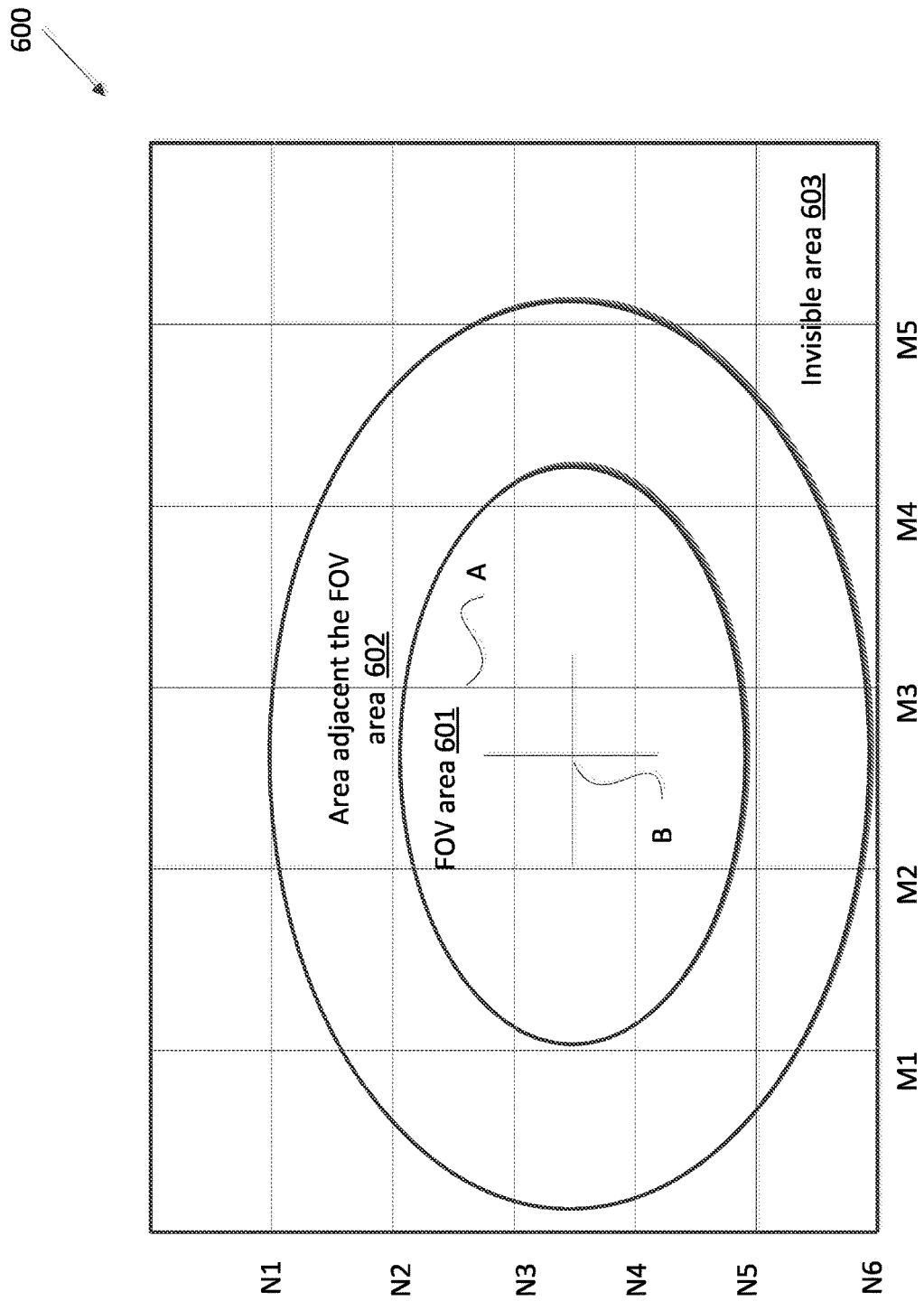
FIG. 6 illustrates the different areas of a grid stitched the panoramic video of 360 degree video scene in two dimension based on the user head motion in four direction (including left and right, up and down) according to an example embodiment.

FIG. 6 illustrates the different areas of a grid stitched panoramic video of 360 degree video scene based on the user head motion according to an example embodiment. The grid 600 illustrates the entire field stored by the VR content server 112. The entire field may, in some embodiments, be a 360 degree view obtained by one or a plurality of cameras.

In FIG. 6, point A is a central point of the grid stitched panoramic video set by the VR content server 112. Point A may be the point in the line "a" in FIGS. 4 and 5. Point B is a center point of the user's field of view, and the point B may be a point in the line "1" in FIG. 4. Just as an example, the point B in FIG. 6 illustrates that the user's head motion in horizontal and vertical directions. Grid 600 comprises the FOV area 601, and area adjacent the FOV area 602 and the invisible area 603.

It is noted that FIG. 6 is just an example of how the areas of the 360 degree video scene may be divided. In other embodiments, the FOV area may be a rectangular area turning the terminal line of sight in two sides of horizontal to the first predetermined angle, and turning the terminal line of sight in two sides of vertical to the second predetermined angle. In should be noted that the first predetermined angle may be different when turns the terminal line in two sides of horizontal. The second predetermined angle may be different when user turns the terminal line of sight in two sides of vertical.

Figure 7:
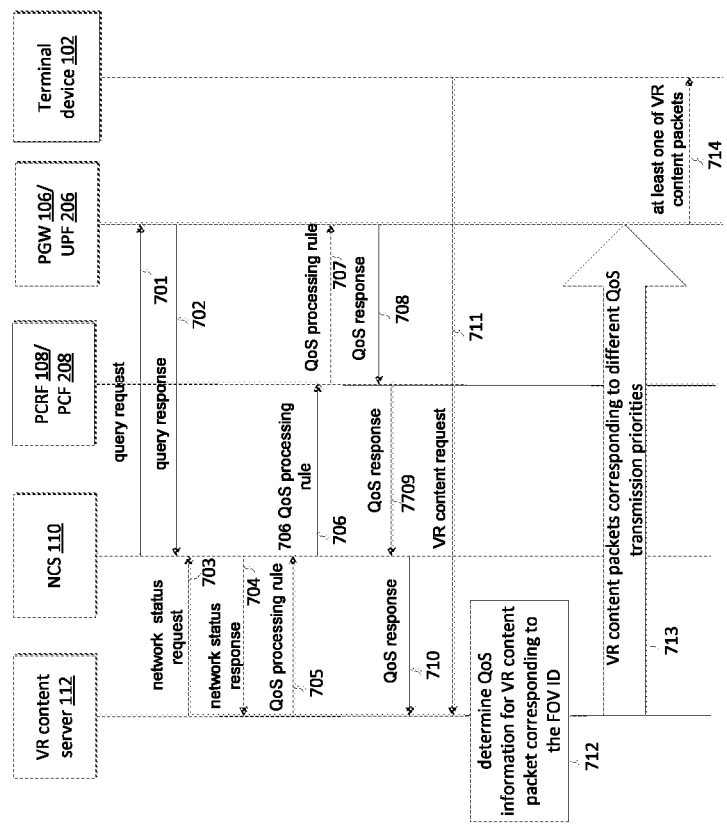
FIG. 7 illustrates a signal flow diagram of an embodiment of a method for sending VR content.

FIG. 7 illustrates a signal flow diagram of an embodiment of a method for transmitting VR content. The method may be carried out in the context of the system as illustrated in FIG. 1 or in FIG. 2, and may use the FOV information as an example as illustrated in FIGS. 4 to 6.

Initially, the NCS 110 sends a query request to the PGW 106 or to the UPF 206 for network data (701). The network data may comprise any known network performance metric and may include any one of latency, throughout, error rate, and packet loss information and they may be in relation to different QoS ratings. In some embodiments, the NCS 202 obtains the network data periodically during the connection between the NCS 202 and the PGW 201 or the UPF 401. And the NCS may use any message to send the query request.

The NCS 110 receives a query response from the PGW 106/UPF 206 (702). The query response contains the network data.

Next, the VR content server 112 sends a network data request to the NCS 110 (703). In some embodiments, the VR content server 112 may send the network data request when the VR content server 112 establishes a connection to the NCS 110. In other embodiments, the VR content server 112 may send the network data request at any time when the VR content server 112 needs, or sends the network data request periodically. The VR content server 112 receives the network data from the NCS 110 via a network data response (704). The network data may comprise at least one of latency, throughout, error rate and packet loss information for different QoS ratings. In some embodiments, the NCS 110 may send the network data to the VR content server 112 based on the request of the VR content server 112. In other embodiments, the NCS 110 may send the network data to the VR content server 112 after the NCS 110 receives the network data from the PGW 106/UPF 206, or the NCS 110 determines that the network data has been changed, or other situation.

The VR content server then 112 sends the QoS processing rule to the NCS 110 (705). After receiving the network data from the NCS 110, the VR content server 112 determines a QoS processing rule for VR content packets. The QoS processing rule may comprises at least one of a VR content server Internet Protocol (IP) address, a VR content server port number, and a terminal device address, a terminal device port number, a protocol type, and information related to how to identify QoS for VR content packets.

Upon receiving the network data from the NCS 110, the VR content server may determine the network status according to an algorithm, such as the VR content server may configure a threshold for each network data, and determine the network status according to the thresholds. Just as an example of Table 1.

TABLE 1 mapping the network status and network a

| Network status | FOV type | | |
|---|---|---|---|
| | bandwidth | latency | packet loss |
| GOOD | Upper 100 | 10 ms | 1e−7 |
| Normal | Between 6 Mbps and 100 Mbps | Between 10 ms and 20 ms | 2e−6 |
| bad | Below 6 Mbps | Below 40 | 1e−4 |

Table 1 shows an example of the relationship between the network status and network data. If the network data received by the VR content server 112 only comprises one of bandwidth, latency and packet loss, the VR content server may determine the network status according to the threshold in Table 1. Furthermore, the VR content server may also configure a rate for each network data, such as the network status corresponding to bandwidth may be 30%, and the network status corresponding to latency may be 30%, and so on. And then the VR content server 112 determines the network status according to the rate of network status for each network data. As it is noted to say, the VR content server 112 may determine the network status using other solutions.

TABLE 2 mapping among the areas of the VR content, QoS and network status

| QOS | areas | | |
|---|---|---|---|
| Network status | FOV area | Area adjacent to the FOV area | Invisible area |
| GOOD | Medium priority | Medium priority | Medium priority |
| Normal | High priority | Medium priority | Low priority |
| bad | High priority | low priority | Low priority |

After determining the network status, the VR content server 112 determines the QoS transmission priority corresponding to the VR content packets in different area of the VR content which is related to the terminal line of sight.

The NCS 110 subsequently sends the QoS processing rule to the PCRF 108/PCF 208 (706) and, thereafter, the PCRF 108/PCF 208 sends the QoS processing rule via a policy and charging control (PCC) rule to the PGW 106 or to the UPF 206 (707).

The QoS processing rule prompts the network element entity (such as the PGW 106 or to the UPF 206) to obtain the QoS transmission priorities for the VR content packets. In some embodiments, the QoS processing rule may also be at least one of a VR content server Internet Protocol (IP) address, a VR content server port, and a terminal device IP address, a terminal device port, a protocol type, and information related to how to identify QoS for VR content packets to prompt the network element entity receiving the QoS processing rule (such as the PGW 106 or to the UPF 206) to obtain the QoS transmission priorities for the VR content packets. For example, the QoS processing rule includes the VR content server address to enable the network element entity to obtain the QoS transmission priorities for the VR content packets from the VR content server 112 having the VR content server address, or the QoS processing rule includes the terminal device address to enable the network element entity to obtain the QoS transmission priorities for the VR content packets sent to the terminal device 102 having the terminal device address In steps 708-710, the PGW 106 or the UPF 206 returns a QoS response to the VR content server 112 via PCRF 108 and NCS 110 or via the PCF 208 and NCS 110. In other embodiments, the QoS response sent to the VR content server 112 by the PGW 106/UPF 206 may directly or indirectly via one or multiple network elements.

The terminal device 102 sends a VR content request to the VR content server 112. where, the VR content request may comprise a FOV ID selected by the terminal device 102 and a URL of a plurality of VR content packets requested by the terminal device 102 (711). In some embodiment, the FOV ID in the VR content request related to a terminal line of sight, which indicates location of the terminal line of sight from a central point of the VR content. The FOV ID is selected by the terminal device 102 based on the terminal device (such as a HMD) motion.

Before the terminal device 102 sends the VR content request, the terminal device 102 selects the FOV ID according to user's head motion via a determination of a sensor 906 and FOV IDs relating to the terminal line of sight from the VR content server 300. The details of selecting the FOV ID may be described in the description of FIG. 5, and FIG. 7. In another embodiment, the VR content request does not include the FOV ID selected by the terminal device 102, but includes the terminal line of sight information. Thereafter, the VR content server 112 determines QoS information for VR content packet corresponding to the FOV ID (712).

After receiving the VR content request from the terminal device 102, the VR content server 112 retrieves VR content packets that had been previously produced and that corresponds to the FOV ID in the VR content request. If the VR content request does not include the FOV ID selected by the terminal device 102, but includes the terminal line of sight information, the VR content server may determine the FOV ID for the VR content request based on the terminal line of sight information and FOV IDs set by the content server 112 in FIG. 5. And then, the retrieves VR content packets that had been previously produced and that corresponds to the FOV ID determined by the VR content server 112.

Each of the VR content packets belongs to a VR content area that are defined for different portion of a single VR content scene in relation to the terminal line of sight. And then, the VR content server 112 determines a quality of service (QoS) transmission priority corresponding to the VR content packets in a VR content area. In some embodiment, the VR content server determines the QoS transmission priority corresponding to VR content area to which the VR content packets belongs according to the information of Table 2. Where the QoS transmission priority indicates a priority level of the VR content packet. Referring to Table 2, and the QoS transmission priority may comprise at least one of high priority, medium priority, and low priority to correspond to the first, second and third QoS transmission priority respectively. And the VR content area may comprise FOV area, area adjacent to the FOV area, and Invisible area.

Therefore, the content server 112 may determine the VR content area for VR content packet of the 360 degree video scene belongs to according to the FOV ID which indicates the angle between the terminal line of sight and the reference line "a".

When selecting, based on the FOV ID, content packets that had been previously encoded from a plurality of sets of VR content packets, the content server 112 selects based on the FOV ID in the VR content request or determined by the VR content server 112, the VR content packets. For example, it is assumed that the FOV ID is 04 which indicates the angle between the line of sight and the reference line of the 360 degree is 40 degree, and the user's head is turned left to 40 degree from the reference line "a" in FIG. 5.

After selecting the VR content packets, the VR content server 112 may determine a quality of service (QoS) information corresponding to each area for VR content packets. Referring to table 2, the VR content server 112 may determine a quality of service (QoS transmission priority (such as high priority, medium priority or low priority) corresponding to each area for VR content packets based on the network status.

The VR content server 112 then sends VR content packets corresponding to different QoS transmission priority for a single VR content scene to the PGW 106 or to UPF 406 (713). Specifically, the VR content packets are sent to the PGW 106 or to UPF 406 in a single flow. The flow is defined by which is defined by 5 elements comprising an IP source address (the VR content server IP address), an IP destination address (the terminal device IP address), a source port (the VR content server port number), a destination port (the terminal device port port), a protocol type. This means that all the VR content packets sent by the VR content server 112 having same IP source address, the IP destination address, the source port, the destination port, and the protocol type.

In some embodiments, the QoS transmission priority comprises at least one of a first QoS transmission priority corresponding to a first plurality of the VR content packets and a second QoS transmission priority corresponding to a second plurality of the VR content packets, or third QoS transmission priority corresponding to a third plurality of the VR content packets. The VR content packets sent by the VR content server comprises at least two of a first plurality of the VR content packets correspond to a first QoS transmission priority, a second plurality of the VR content packets correspond to a second QoS transmission priority, a third plurality of the VR content packets correspond to a second QoS transmission priority.

In some embodiments, the QoS transmission priority may be included in each VR content packets, in other embodiments, the QoS transmission priority may be included in message header to correspond to VR content packets. For example, the QoS transmission priority may be included in a type of server field at IP header if the VR content packets are sent to the PGW 106 or to UPF 406 via differentiated service control point (DSCP) approach. For another example, the QoS transmission priority may be included in a custom payload if the VR content packets are sent to the PGW 106 or to UPF 406 via Dynamic Adaptive Streaming over HTTP (DASH) approach.

In some embodiments, after the VR content server 112 receives the VR content request from the terminal device 102, the VR content server 112 may store the information relating to a terminal line of sight in the VR content request, and predict according to the stored of the previous VR content requests and the information relating to a terminal line of sight, a predicted FOV ID for next VR content request (the FOV ID for next VR content request may also called last obtained FOV ID), and encodes multiple VR content packets corresponding to the predicted FOV ID for next VR content request, wherein each the encoded VR content packet belongs to a VR content area. In other embodiments, if the VR content request does not include the FOV ID selected by the terminal device 102, but includes the terminal line of sight information, the VR content server 112 may determine the FOV ID for the VR content request. After determining the FOV ID for the VR content request, the VR content server 112 may store the FOV ID for the VR content request, and determine according to the stored FOV IDs, a FOV ID for next VR content request, and encodes multiple VR content packets corresponding to the determined FOV ID for next VR content request, wherein each the encoded VR content packet belongs to a VR content area.

When the VR content server 112 encodes multiple VR content packets corresponding to the predicted FOV ID for next VR content request, to overcome prediction error, the VR content server 112 further encodes multiple VR content packets corresponding to a FOV IDs which adjacent to the predicted FOV ID for the next VR content server 112. For example, referring to FIG. 5, the determined FOV ID for the next VR content request is 02, the FOV IDs adjacent to the FOV ID 02 are FOV ID 04 and the FOV ID 00. Specifically, the predicted FOV ID (also called last obtained FOV ID), the FOV IDs which adjacent to the last obtained FOV ID for the next VR content request may also called a first expected FOV ID, a second expected FOV ID and a third expected FOV ID., if the VR content server 112 determines the predicted FOV ID in the next VR content request is 02 (which indicates the user's head turn left 20 degree), the VR content server 112 encodes a plurality of sets of VR content packets to correspond to the predicted FOV 02 for the next VR content request, correspond to the FOV ID adjacent to the predicted FOV ID, such as correspond to 00, or correspond to 04. In other embodiment, the plurality of sets of VR content packets may correspond to more FOV IDs.

Finally, the PGW 2106/UPF 406 sends at least one of the VR content packets to the terminal device 102 based on the indicated priority level that corresponds to the QoS transmission priority (714). In some embodiments, the PGW 2106/UPF 406 maps QoS priority of VR content packets into QCI (QoS Classification Identifier) in mobile network, sends the VR content packets with a high QoS transmission priority at first, and then sends the VR content packets with medium QoS transmission priority and with low QoS transmission priority. In other embodiments, the VR content server 112 discarding the VR content packets with lower QoS transmission priority, the PGW 201/UPF 401 may discard the VR content packets with low QoS transmission priority, especially when the network status is not good. That means, the PGW 201/UPF 401 sends at least one of the plurality of VR content packets to the terminal device based on the indicated priority level that corresponds with the QoS transmission priority and based on the network status.

By including the quality of service (QoS) transmission priorities that indicates a priority level of the VR content packet and corresponds to a VR content area to which the VR content packets belongs the PGW 2106/UPF 406 may send the VR content packets to the terminal device 100 based on the indicated priority level that corresponds with the QoS transmission priorities. Therefore, the transferring solution can be performed based on QoS information, and the user experience can be improved. By sending the VR content packet with a high QoS transmission priorities and discarding the VR content packets with low QoS transmission priorities based on the network status, it can be sure that the VR content packet with a high QoS transmission priorities can be sent to the terminal device, therefore, the user may have a good experience.

Figure 8:
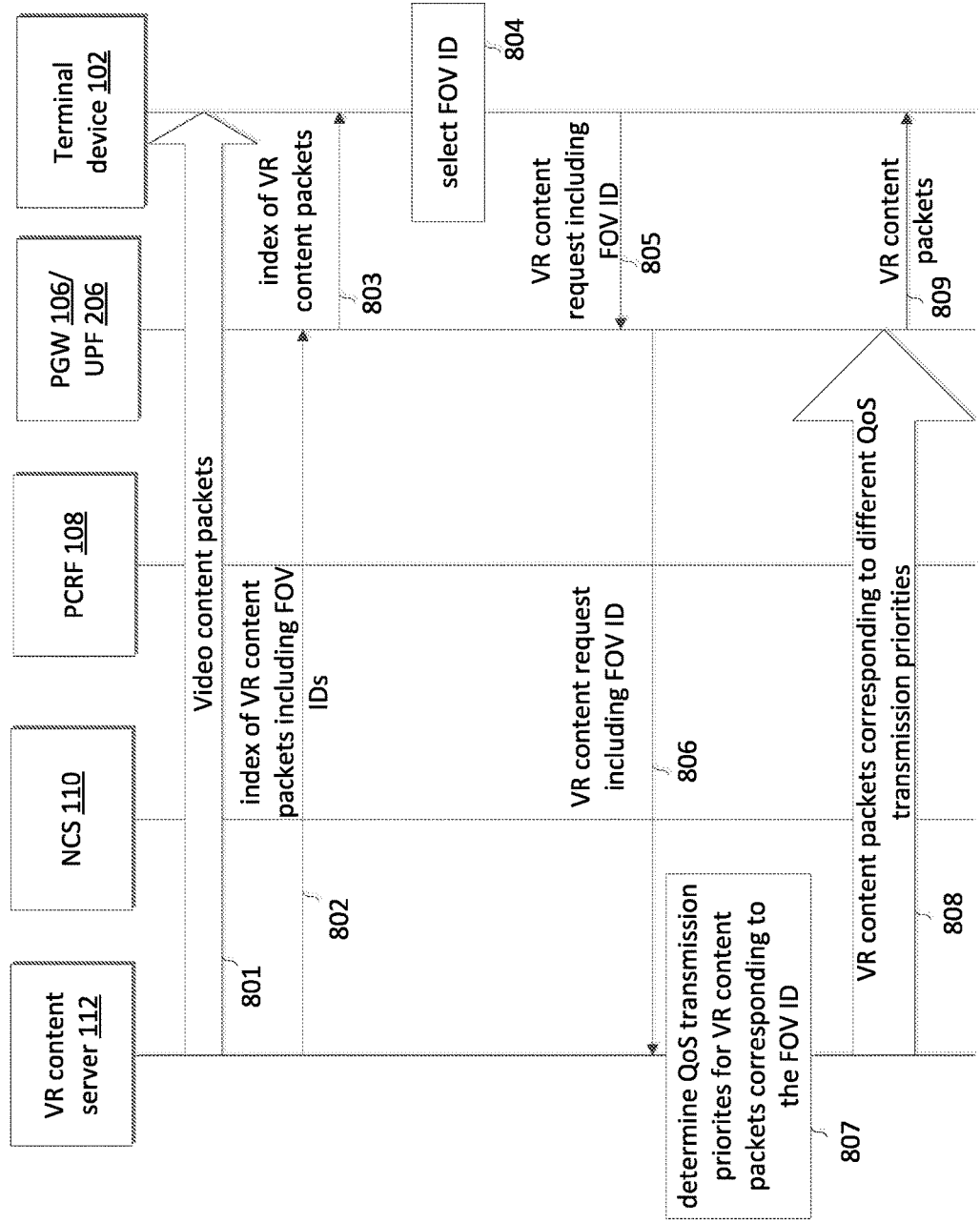
FIG. 8 illustrates a signal flow diagram of an embodiment of a method for sending VR content packets for a VR content scene.

FIG. 8 illustrates a signal flow diagram of an embodiment of a method for sending VR content packets for a VR content scene. The embodiment of FIG. 8 may be carried out in the context of the system as illustrated in FIG. 1 or in FIG. 2, and may use the FoV as an example as illustrated in FIGS. 4-6.

Initially, the VR content server 112 sends the VR content packets to the terminal device 102. This step is same as the steps 713 and 714 (801). In steps 802 and 803, the VR content server 112 sends an index of the VR content scene to the terminal device 102. Thereafter, the VR content server 112 encodes a plurality of sets of VR content packets corresponding to multiple FOV IDs including the predicted FOV ID for the next VR content request (711). In some embodiments, the VR content server 112 may encodes the plurality of sets of VR content packets corresponding to FOV IDs which is adjacent to the predicted FOV ID. Such as, it is assumed that the predicted FOV ID is 04, and the FOV IDs which are adjacent to the predicted FOV ID are 04 and 02. And then the VR content server 300 stores the plurality of VR content packets based on the FOV IDs (including the predicted FOV ID, and the FOV IDs adjacent to the predicted FOV IDs, or other FOV IDs such as FOV IDs adjacent to the FOV IDs adjacent to the predicted FOV IDs).

The VR content server 300 generates index for the encoding VR content packets corresponding to various FOV IDs. The index of the VR content comprises FOV IDs of the VR content packets and a URL of the VR content packets corresponding to each FOV ID of the FOV IDs.

As an example, in step 711, the VR content server 112 encodes the VR content packets corresponding to the FOV ID 04, encodes the VR content packets corresponding to the FOV ID 06 and the VR content packets corresponding to the FOV ID 02 referring to FIG. 5. The index sent to the terminal device 100 includes the index of FOV ID 04. FOV ID 06 and FOV ID 02, and the URL of the VR content packets corresponding to FOV ID 04, the URL of the VR content packets corresponding to FOV ID 02, the URL of the VR content packets corresponding to FOV ID 02. In other example, the VR content server 112 may further encodes the VR content packets corresponding to the FOV ID 00 or FOV ID 08, and so on.

The terminal device 102 selects a FOV ID from the index for the next VR content request based on terminal line of sight (804).

Upon receiving the index from the VR content server 112, the terminal device 102 obtains a terminal line of sight of the user, from a sensor 103 of the terminal device, and determines terminal line of sight of the user based on the user's head location. In some embodiments, the sensor 806 detects the user's head motion, and then the terminal device, such as the VR content client of the terminal device determines the terminal line of sight based on the user's head location, and selects the FOV ID which is nearest to the terminal line of sight determined by the terminal device.

In step 805-806, the terminal device 102 sends a VR content request to the VR content server via the PGW 106/UPF 206. The VR content request comprise field of view (FOV) ID. So that the VR content server 112 may select VR content packets based on the FOV ID in the VR content request. In some embodiment, the VR content request may also comprise the URL of the VR content packets, so that the VR content server 112 may select VR content packets according to the URL of the VR content packets.

In some embodiments, the index of the VR content scene may not include the FOV IDs, and the VR content request does not include the FOV ID selected by the terminal device 102, but includes the terminal line of sight information.

The VR content server 112 determine QoS transmission priorities for VR content packets corresponding to the FOV ID (807). This step is same as the step 712.

In step 808-809, the VR content server 112 sends, the VR content packets via the PGW 106/UPF 206 to the terminal device 102. These steps are same as steps 713-714.

Figure 9:
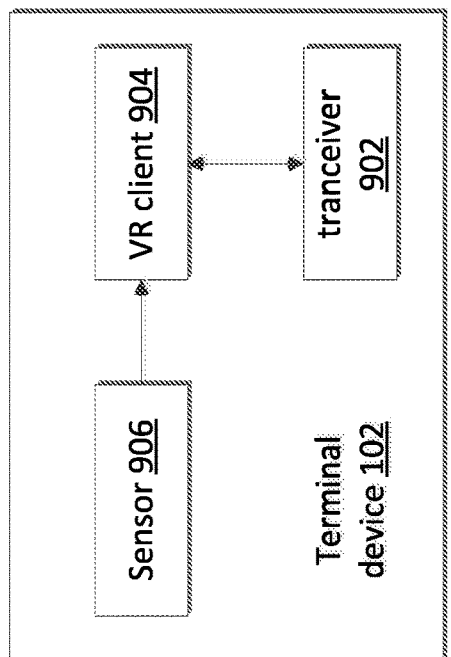
FIG. 9 illustrates a block diagram of hierarchical terminal device 102 according to an embodiment of the invention.

FIG. 9 illustrates a block diagram of hierarchical terminal device 102 according to an embodiment of the invention. The terminal device 10 may be embodied in a microprocessor-based computer, such as a general purpose personal computer (PC), a custom-made PC, a portable device such as a tablet computer or a smart phone, but the scope of the invention is not limited to such examples. The terminal device 102 includes a transceiver 902, a VR client 904, and a sensor 906. The VR client 904 is connected to the transceiver 902 and the sensor 906.

The transceiver 902 includes any suitable structure for generating signals for wireless transmission and/or processing signals received wirelessly. And the transceiver 902 may be receive or sends signals from or to (3G, 4G, 5G), Universal Mobile Telecommunications Service (UMTS), Code Division Multiple Access (CDMA), Global System for Mobiles (GMS) etc. network. The VR client 904 and the sensor 906 of terminal device maybe embodied in a general-purpose central procession unit (CPU), general process, digital signal processor (DSP), field programmable gate array (FPGA), an application-specific integrated circuit (ASIC), or one or more integrated circuits configured to control the execution of program routines as specified by the present invention. The above modules of terminal device may also be a combination of computing function, such as a combination including one or more microprocessors, combination including DSP and microprocessors and so on. The sensor 906 may be a nine-axis attitude sensor including a three-axis gyroscope, a three-axis acceleration sensor, and a three-axis magnetic sensor. The sensor 906 may sense a user's motion posture.

The transceiver 902 receives an index of a VR content scene sent from the VR content server 112 via a network, such as network 104/204. Where the index comprises at least two field of view identifiers (FOV IDs) in relation to a terminal line of sight.

The VR client 904 receives the index from the transceiver 902, and obtains a terminal line of sight from the sensor 906, and select a FOV ID from the index based on the terminal line of sight.

The transceiver 902 sends a VR content request comprising the selected FOV ID for the VR content scene. In addition, the transceiver 902 further receives VR content packets having a second and lower QoS and also having a different FOV ID of the VR content scene. and the VR client 904 may display the VR content packets.

The sensor 906 provides the terminal line of sight to the terminal. The VR client 904 may display the first and the second plurality of the VR content packets.

It is understand that except the above functions, the transceiver 902, the VR client 904 and the sensor 906 may also perform the functions of terminal device 102 described in FIGS. 1-8.

Figure 10:
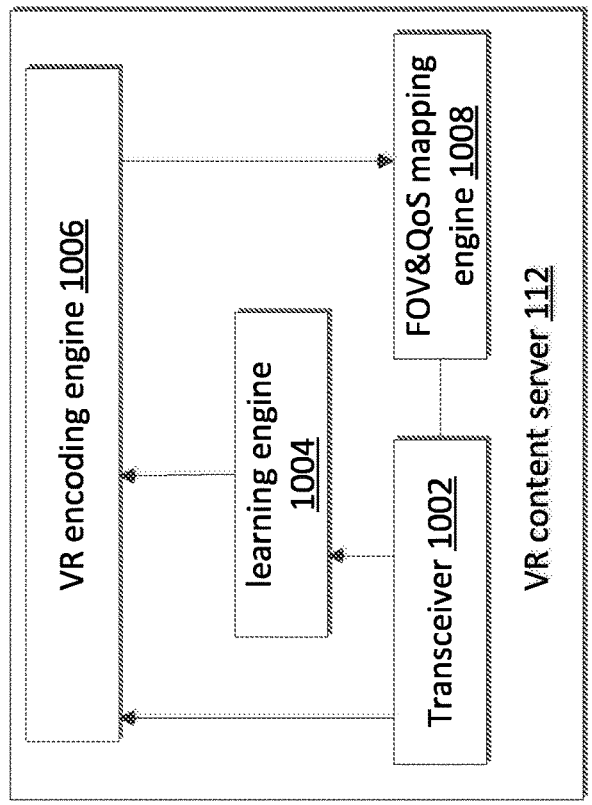
FIG. 10 illustrates a block diagram of hierarchical virtual reality (VR) content server 112 according to an embodiment of the invention.

FIG. 10 illustrates a block diagram of hierarchical virtual reality (VR) content server 112 according to an embodiment of the invention. The VR content server 112 may be embodied in a microprocessor-based computer, such as a general purpose personal computer (PC), a custom-made PC, a portable device such as a tablet computer or a smart phone, but the scope of the invention is not limited to such examples. The VR content server 112 includes a transceiver 1002, a learning engine 1004, a VR encoding engine 1006 and a FOV & QoS mapping engine 1008.

The transceiver 1002 is connected to the learning engine 1004 and the VR encoding engine 1006 to send a VR content request to the learning engine 1004 and the VR encoding engine 1006. The leaning engine 1004 is also connected to the VR encoding engine 1006 to provide a predicted FOV ID for the next VR content request to the VR encoding engine 1004. The VR encoding engine 1006 may also connect to the FOV & QoS mapping engine 1006 to send the VR content packets to the FOV & QoS mapping engine 1008. The FOV & QoS mapping engine 1008 may connect to the transceiver 1002 to send the VR content packets and the QoS transmission priority to the FOV & QoS mapping engine 1008.

The transceiver 1002 receives information sending by a terminal device 102 across the network 200 or network 400, and sends information to the terminal device 102. Such as the transceiver 301 receives a VR content request for a single VR content scene, wherein the VR content request comprises information relating to a terminal line of sight. The VR encoding engine 1006 obtains, based on the information relating to the terminal line of sight, a field of view identifier (FOV ID) for the VR content request, and selects, based on the FOV ID, VR content packets that had been previously encoded from a plurality of sets of VR content packets. The FOV&QoS mapping engine 1008 receives the VR content packets selected by the VR encoding engine 1006 for the VR content request and determines quality of service (QoS) transmission priority for VR content packets. Wherein the QoS transmission priority comprises a first QoS transmission priority for a first plurality of the VR content packets and a second QoS transmission priority for a second plurality of the VR content packets.

The transceiver 1002 further transmits VR content packets and the QoS transmission priority. Wherein, the VR content packets sent by the transceiver 1002 comprises the first plurality of the VR content packets corresponding to the first QoS transmission priority, and the second plurality of the VR content packets corresponding to the second QoS transmission priority.

In some embodiments, after receiving the VR content request, the transceiver 1002 sends the VR content request to the learning engine 1004. The learning engine 1004 determines a FOV ID for the next VR content request according to the stored FOV IDs of the previous VR content requests and the information relating to a terminal line of sight. In some embodiments, the information relating to a terminal line of sight is a FOV ID. In other embodiment, the information relating to a terminal line of sight comprises information of the terminal line of sight (such as the location of the terminal line of sight), and the learning engine 1004 may also determine the FOV ID which corresponds to the information of the terminal line of sight. In addition, except determining the FOV ID for the next VR content request, the learning engine 1004 stores the FOV ID of the VR content request and send the FOV ID for the next VR content request to the VR encoding engine 1006. The VR encoding engine 1006 encodes multiple set of VR content packets corresponding to the determined FOV ID for next VR content request.

It is understand that except the above functions, the transceiver 1002, the learning engine 1004, the VR encoding engine 1006 and the FOV & QoS mapping engine 1008 may also perform the functions of VR content server 112 described in FIGS. 1-8.

Any of the learning engine 1004, VR encoding engine 1006, and the FOV&QoS mapping engine 1008 maybe embodied in a general-purpose central procession unit (CPU), general process, digital signal processor (DSP), field programmable gate array (FPGA), an application-specific integrated circuit (ASIC), or one or more integrated circuits configured to control the execution of program routines as specified by the present invention. The learning engine 1004, VR encoding engine 1006, and the FOV&QoS mapping engine 1008 may also be a combination of computing function, such as a combination including one or more microprocessors, combination including DSP and microprocessors and so on. The transceiver 1002 includes any suitable structure for generating signals for wireless transmission and/or processing signals received wirelessly. And the transceiver 902 may be receive or sends signals from or to (3G, 4G, 5G), Universal Mobile Telecommunications Service (UMTS), Code Division Multiple Access (CDMA), Global System for Mobiles (GMS) etc. network.

Figure 11:
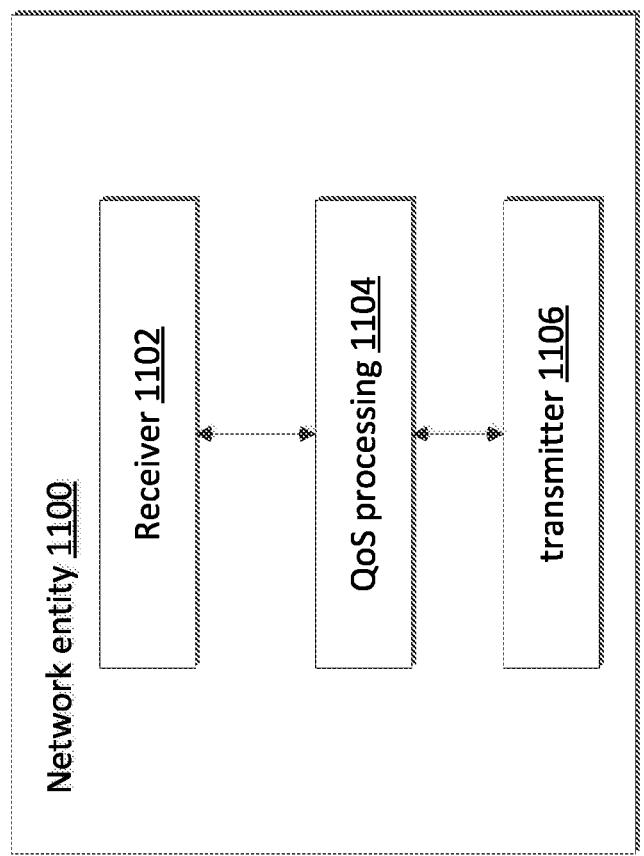
FIG. 11 illustrates a block diagram of hierarchical network entity 1100 according to an embodiment of the invention.

FIG. 11 illustrates a block diagram of hierarchical network entity 1100 according to an embodiment of the invention. The network entity 1100 may be the PGW 106, or the UPF 206 or any other function entity. And the network entity 1100 may be embodied in a microprocessor-based computer, such as a general purpose personal computer (PC), a custom-made PC, a portable device such as a tablet computer or a smart phone, but the scope of the invention is not limited to such examples. The network entity 1100 includes a receiver 1102 and a transmitter 1106. The receiver 1102 is connected to the transmitter 1106.

The receiver 1102 receives VR content packets transmitted by a VR content server for a single VR content scene and quality of service (QoS) transmission priorities for the VR content packets, The QoS processing 1104 obtains the QoS transmission priorities mapping to the VR content packets. Where the QoS transmission priorities comprise a first QoS transmission priority corresponding to a first plurality of the VR content packets and a second QoS transmission priority corresponding to a second plurality of the VR content packets. And the transmitter 1106 transmits the first plurality of the VR content packets based on the first QoS transmission priority and the second plurality of the VR content packets based on the second transmission priority, wherein the second QoS transmission priority is different from the first QoS transmission priority.

In at least one embodiment, the network entity 1100 may also perform the functions of PGW 106 and UPF 206 described in FIGS. 1-8.

The QoS processing maybe embodied in a general-purpose central procession unit (CPU), general process, digital signal processor (DSP), field programmable gate array (FPGA), an application-specific integrated circuit (ASIC), or one or more integrated circuits configured to control the execution of program routines as specified by the present invention. The above modules of VR content server 112 may also be a combination of computing function, such as a combination including one or more microprocessors, combination including DSP and microprocessors and so on. The transceiver 1102 and the transmitter 1106 may include any suitable structure for generating signals for wireless transmission and/or processing signals received wirelessly. And the transceiver 902 may be receive or sends signals from or to (3G, 4G, 5G), Universal Mobile Telecommunications Service (UMTS), Code Division Multiple Access (CDMA), Global System for Mobiles (GMS) etc. network.

Figure 12:
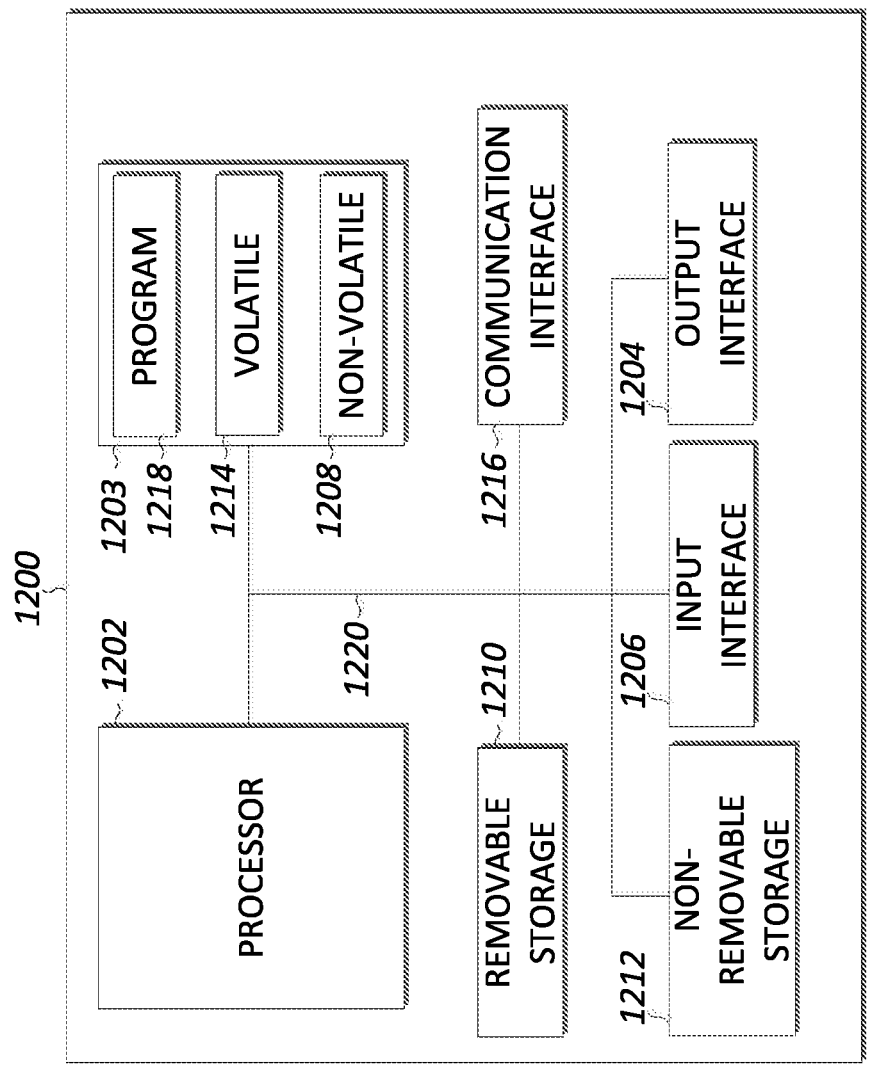
FIG. 12 illustrates a block diagram illustrating circuitry for implementing one or more elements, such as VR content server, network elements (PGW, UPF, PCRF, Base station and so on), routers, terminal device, or other equipment for performing methods according to example embodiments for transmitting, receiving or processing VR content according to the described aspects and embodiments of the invention.

FIG. 12 illustrates a block diagram illustrating circuitry for implementing one or more elements, such as VR content server, network elements (PGW, UPF, PCRF, Base station and so on), routers, terminal device, or other equipment for performing methods according to example embodiments for transmitting, receiving or processing VR content according to the described aspects and embodiments of the invention. All components need not be used in various embodiments. For example, the VR content server may comprise cloud computing resources and have little need for direct user I/O devices. UEs may not include disk drive type storage devices, and other equipment may use different sets of components. One example computing device in the form of a computer 1200 may include a processor 1202 and a memory 1203 in communication with the processor 1202 via a bus 1220. The memory 1203 can comprise one or both of removable storage 1210 or non-removable storage 1212 that includes computer instructions for transmitting, receiving or processing VR content according to the described aspects and embodiments of the invention. It should be noted, for example, that the memory may include computer instructions that, when executed by the processor, prompt the processor, or more generically, the device that houses the processor, to perform any of the functions described herein and in particular, in the method descriptions of this specification. Memory 1203 may include volatile memory 1214 and/or non-volatile memory 1208. Although the example computing device is illustrated and described as computer 1200, the computing device may be in different forms in different embodiments. For example, the computing device may instead be a smartphone, a tablet, smartwatch, or other computing device including the same or similar elements as illustrated and described with regard to FIG. 12 that can receive and display VR content. Devices, such as smartphones, tablets, and smartwatches, are generally collectively referred to as mobile devices or user equipment. Further, although the various data storage elements are illustrated as part of the computer 1200, the storage may also or alternatively include cloud-based storage accessible via a network, such as the Internet or server based storage.

Computer 1200 may include or have access to a computing environment that includes a variety of computer-readable media, such as volatile memory 1214 and/or non-volatile memory 1208, removable storage 1210 and/or non-removable storage 1212 coupled to the bus 1220. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to an input interface 1206, an output interface 1204, and a communication interface 1216 coupled to the bus 1220. The output interface 1204 may include a display device, such as a touchscreen, that also may serve as an input device. The input interface 1206 may include one or more of a touchscreen, touchpad, mouse, keyboard, camera, one or more device-specific buttons, one or more sensors integrated within or coupled via wired or wireless data connections to the computer 500, and other input devices. The computer 1200 may operate in a networked environment using the communication interface 1216 to connect to one or more remote computers, such as database servers or other devices or systems. The remote computer may include a personal computer (PC), server, router, network PC, a peer device or other common DFD network switch, or the like. The communication interface 1216 may communicate over a Local Area Network (LAN), a Wide Area Network (WAN), cellular network, WiFi, Bluetooth, or other networks or systems. According to one embodiment, the various components of computer 1200 are connected with a system bus 1220.

Computer-readable instructions 1218 stored on a computer-readable medium (such as being stored within the memory 1203) are executable by the processor 1202 of the computer 1200. The terms computer-readable medium and storage device do not include carrier waves or signals, to the extent carrier waves and signals are deemed too transitory. Storage can also include networked storage such as a storage area network (SAN).

In an example, the computer 1200 includes a memory 1203 comprising instructions 1218 and one or more processors 1202 in communication with the memory 1203, wherein the one or more processors 1202 execute the instructions 1218 to receive VR content packets transmitted by a VR content server for a single VR content scene and quality of service (QoS) transmission priorities for the VR content packets and transmit the first plurality of the VR content packets based on the first QoS transmission priority and the second plurality of the VR content packets based on the second transmission priority, when the computer 1200 performs as a network element.

Additional aspects of the embodiments of the are illustrated the following examples:

Example 1. A method by a network element for transmitting virtual reality (VR) content, comprising:
receiving VR content packets transmitted by a VR content server for a single VR content scene and quality of service (QoS) transmission priorities for the VR content packets, wherein the QoS transmission priorities comprise a first QoS transmission priority corresponding to a first plurality of the VR content packets and a second QoS transmission priority corresponding to a second plurality of the VR content packets; and
transmitting the first plurality of the VR content packets based on the first QoS transmission priority and the second plurality of the VR content packets based on the second transmission priority, wherein the second QoS transmission priority is different from the first QoS transmission priority.

Example 2. The method of example 1 wherein a plurality of VR content areas are defined for different portions of the single VR content scene in relation to a field of view (FOV) of a user.

Example 3. The method according to any one of examples 1-2 wherein the QoS transmission priorities corresponds to the VR content packets of VR content areas respectively.

Example 4. The method according to any one of examples 1-3, further comprising: receiving a policy and, charging control (PCC) rule, wherein the PCC rule comprises a QoS processing rule to prompt the network element entity to determine the QoS transmission priority for the VR content packets.

Example 5. The method according to any one of examples 1-4, wherein the QoS processing rule comprises a VR content server address to enable the network element entity to obtain the QoS transmission priorities for the VR content packets from the VR content server.

Example 6. The method according to any one of examples 1-5, further comprising discarding a third plurality of VR content packets with a third QoS transmission priority.

Example 7. The method according to any one of examples 1-6, wherein the first plurality of the VR content packets based on the first QoS transmission priority and the second plurality of the VR content packets based on the second transmission priority are sent by the VR content server via a single flow between the VR content server and the network element entity.

Example 8. A method by a virtual reality (VR) content server for transmitting VR content, comprising:
receiving a VR content request for a single VR content scene, wherein the VR content request comprises information relating to a terminal line of sight;
obtaining, based on the information relating to the terminal line of sight, a field of view identifier (FOV ID) for the VR content request;
selecting, based on the FOV ID, VR content packets that had been previously encoded from a plurality of sets of VR content packets;
determining quality of service (QoS) transmission priority for VR content packets, wherein the QoS transmission priority comprises a first QoS transmission priority for a first plurality of the VR content packets and a second QoS transmission priority for a second plurality of the VR content packets; and
transmitting the VR content packets and the QoS transmission priority.

Example 9. The method according to example 8, wherein determining the QoS priority comprises:
receiving network data information; and, wherein determining the QoS priority includes determine QoS priority based on the network status.

Example 10. The method according to any one of examples 8-9, wherein the network data comprises at least one of throughput information, latency information, packet loss information or error rate information.

Example 11. The method according to any one of examples 8-10, further comprising sending a QoS processing rule to a network element, wherein the QoS processing rule prompts the network element to utilize QoS transmission priorities based on QoS information.

Example 12. The method according to any one of examples 8-11, wherein the QoS processing rule comprises at least one of a resource address and a destination address.

Example 13. The method according to any one of examples 8-12, further comprising:
sending, before the receiving a VR content request from a VR terminal device, an index of the VR content scene to the terminal device, wherein the index comprises at least two field of view identifiers (FOV ID) relating to a terminal line of sight; wherein the FOV ID in the VR content request is selected from the index according to the terminal line of sight.

Example 14. The method according to any one of examples 8-13, further comprising, prior to receiving a VR content request, encoding the plurality of sets of VR content packets; wherein a first set corresponds to a first expected FOV ID, a second set corresponds to a second expected FOV ID, and a third set corresponds to a third expected ID.

Example 15. The method according to any one of examples 8-14, wherein the first, second and third expected FOV ID are predicted based upon a last obtained FOV ID in relation to a last terminal line of sight.

Example 16. The method according to any one of examples 8-15, the information relating to the terminal line of sight is FOV ID relating to the terminal line of sight, or the terminal line of sight information.

Example 17. The method according to any one of examples 8-16, wherein the VR content packets and the QoS transmission priority is transmitted to the network element via a single channel.

Example 18. A method by a terminal device for receiving virtual reality (VR) content, comprising:

receiving an index of a VR content scene, wherein the index comprises at least two field of view identifiers (FOV IDs) in relation to a terminal line of sight;

electing a FOV ID from the index based on a terminal line of sight;

sending a VR content request comprising the selected FOV ID for the VR content scene;

receiving the VR content packets having a first QoS corresponding to the selected FOV ID of the VR content scene; and receiving VR content packets having a second and lower QoS and also having a different FOV ID of the VR content scene.

Example 19. The method according to example 18, wherein the VR content packets have different quality of service (QoS) transmission priorities, and wherein the method further comprises:

displaying the VR content packets based on the QoS transmission priorities.

Example 20. The method according to any one of example 18-19, wherein the VR content packets comprises a first plurality of the VR content packets corresponding to a first QoS transmission priority and a second plurality of the VR content packets corresponding to a second QoS transmission priority and a third plurality of the VR content packets corresponding to a third QoS transmission priority; the displaying the VR content packets based on the QoS information comprises:

displaying the first and the second plurality of the VR content packets.

Example 21. The method according to any one of examples 18-20, further comprising:

sending a relationship between the FOV ID and the terminal line of sight.

Example 22. A network element, comprising: a non-transitory memory comprising instructions, and one or more processors in communications with the memory, wherein the one or more processors are configured to execute the instructions to:

receive VR content packets transmitted by a VR content server for a single VR content scene and quality of service (QoS) transmission priorities for the VR content packets, wherein the QoS transmission priorities comprise a first QoS transmission priority corresponding to a first plurality of the VR content packets and a second QoS transmission priority corresponding to a second plurality of the VR content packets; and transmit the first plurality of the VR content packets based on the first QoS transmission priority and the second plurality of the VR content packets based on the second transmission priority, wherein the second QoS transmission priority is different from the first QoS transmission priority.

Example 23. The network element according to example 22, wherein the one or more processors are configured to further execute the instructions to:

receive a policy and charging control (PCC) rule, wherein the PCC rule comprises a QoS processing rule to prompt the network element entity to determine the QoS transmission priority for the VR content packets.

Example 24. The network element according to any one of examples 22-23, wherein the one or more processors are configured to further execute the instructions to:

discarding a third plurality of VR content packets with a third QoS transmission priority.

Example 25. A virtual reality (VR) content server, comprising: a non-transitory memory comprising instructions, and one or more processors in communications with the memory, wherein the one or more processors are configured to execute the instructions to:

receive a VR content request for a single VR content scene, wherein the VR content request comprises information relating to a terminal line of sight;

obtain, based on the information relating to the terminal line of sight, a field of view identifier (FOV ID) for the VR content request;

select, based on the FOV ID, VR content packets that had been previously encoded from a plurality of sets of VR content packets;

determine quality of service (QoS) transmission priority for VR content packets, wherein the QoS transmission priority comprises a first QoS transmission priority for a first plurality of the VR content packets and a second QoS transmission priority for a second plurality of the VR content packets; and transmit the VR content packets and the QoS transmission priority.

Example 26. The network element according to example 25, comprising: wherein the one or more processors are configured to further execute the instructions to:

receiving network data information; and wherein determining the QoS priority includes determine QoS priority based on the network status.

Example 27. A terminal device, comprising: a non-transitory memory comprising instructions, and one or more processors in communications with the memory, wherein the one or more processors are configured to execute the instructions to:

receive an index of a VR content scene, wherein the index comprises at least two field of view identifiers (FOV IDs) in relation to a terminal line of sight;

select a FOV ID from the index based on a terminal line of sight;

send a VR content request comprising the selected FOV ID for the VR content scene;

receive the VR content packets having a first QoS corresponding to the selected FOV ID of the VR content scene; and receive VR content packets having a second and lower QoS and also having a different FOV ID of the VR content scene.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method by a virtual reality (VR) content server for transmitting VR content, comprising:

sending an index of a VR content scene to a terminal device, wherein the index comprises at least two field of view identifiers (FOV ID) of the VR content scene;

receiving a VR content request for the VR content scene, wherein the VR content request comprises a first FOV ID selected from the index by the terminal device based on information relating to a terminal line of sight;

selecting, based on the first FOV ID, VR content packets that had been previously encoded from a plurality of sets of VR content packets, wherein a first plurality of the VR content packets corresponds to the first FOV ID, and a second plurality of the VR content packets corresponds to a second FOV ID in the index;

determining quality of service (QoS) transmission priority for the selected VR content packets, wherein the QoS transmission priority comprises a first QoS transmission priority for the first plurality of the selected VR content packets and a second QoS transmission priority for the second plurality of the selected VR content packets, and the first QoS transmission priority is different from the second QoS transmission priority; and transmitting the VR content packets with the QoS transmission priority in a single flow to a network element.

2. The method according to claim 1, wherein determining the QoS priority comprises:
receiving network data information; and
wherein determining the QoS priority includes determine QoS priority based on the network status.

3. The method according to claim 2 wherein the network data comprises at least one of throughput information, latency information, packet loss information or error rate information.

4. The method according to claim 1 further comprising sending a QoS processing rule to the network element, wherein the QoS processing rule prompts the network element to utilize QoS transmission priorities based on QoS information, and the QoS processing rule indicates the priorities for a FOV area, an area adjacent to the FOV area and an invisible area in a VR content scene.

5. The method of claim 4 wherein the QoS processing rule comprises at least one of a source address and a destination address.

6. The method according to claim 1, further comprising, prior to receiving the VR content request, encoding the plurality of sets of VR content packets;
wherein a first set corresponds to a first expected FOV ID, a second set corresponds to a second expected FOV ID, and a third set corresponds to a third expected ID.

7. The method according to claim 6 wherein the first, second and third expected FOV ID are predicted based upon a last obtained FOV ID in relation to a last terminal line of sight.

8. The method according to claim 1, the information relating to the terminal line of sight is FOV ID relating to the terminal line of sight, or the terminal line of sight information.

9. The method according to claim 1, wherein the VR content packets and the QoS transmission priority is transmitted to the network element via a single channel.

10. A virtual reality (VR) content server, comprising:
a non-transitory memory comprising instructions; and
one or more processors in communications with the memory, wherein the one or more processors are configured to execute the instructions to:

send an index of a VR content scene to a terminal device, wherein the index comprises at least two field of view identifiers (FOV ID) of the VR content scene;

receive a VR content request for the VR content scene, wherein the VR content request comprises a first FOV ID selected from the index by the terminal device based on information relating to a terminal line of sight;

select, based on the first FOV ID, VR content packets that had been previously encoded from a plurality of sets of VR content packets, wherein a first plurality of the VR content packets corresponds to the first FOV ID, and a second plurality of the VR content packets corresponds to a second FOV ID in the index;

determine quality of service (QoS) transmission priority for the selected VR content packets, wherein the QoS transmission priority comprises a first QoS transmission priority for the first plurality of the selected VR content packets and a second QoS transmission priority for the second plurality of the selected VR, and the first QoS transmission priority is different from the second QoS transmission priority;

transmit the VR content packets with the QoS transmission priority in a single flow to a network element.

11. The virtual reality (VR) content server according to claim 10, comprising:
wherein the one or more processors are configured to further execute the instructions to:
receiving network data information; and
wherein determining the QoS priority includes determine QoS priority based on the network status.

12. The virtual reality (VR) content server according to claim 11, wherein the network data comprises at least one of throughput information, latency information, packet loss information or error rate information.

13. The virtual reality (VR) content server according to claim 10, comprising: wherein the one or more processors are configured to further execute the instructions to:
send a QoS processing rule to the network element, wherein the QoS processing rule prompts the network element to utilize QoS transmission priorities based on QoS information, and the QoS processing rule indicates the priorities for a FOV area, area adjacent to the FOV area and invisible area in a VR content scene.

14. The virtual reality (VR) content server according to claim 10, wherein the QoS processing rule comprises at least one of a source address and a destination address.

15. The virtual reality (VR) content server according to claim 10, comprising: wherein the one or more processors are configured to further execute the instructions to:
encode the plurality of sets of VR content packets prior to receiving the VR content request, wherein a first set corresponds to a first expected FOV ID, a second set corresponds to a second expected FOV ID, and a third set corresponds to a third expected ID.

16. The virtual reality (VR) content server according to claim 15, wherein the first, second and third expected FOV ID are predicted based upon a last obtained FOV ID in relation to a last terminal line of sight.

17. The virtual reality (VR) content server according to claim 15, wherein the first, second and third expected FOV ID are predicted based stored FOV IDs of the previous VR content requests and the information relating to a terminal line of sight.

18. The virtual reality (VR) content server according to claim 10, wherein the information relating to the terminal line of sight is FOV ID relating to the terminal line of sight, or the terminal line of sight information.

19. The virtual reality (VR) content server according to claim 10, wherein the VR content packets and the QoS transmission priority is transmitted to the network element via a single channel.

* * * * *